United States Patent [19]
Cain

[11] Patent Number: 5,712,042
[45] Date of Patent: Jan. 27, 1998

[54] SECOND SEAL FOR CLOSURE LINERS

[75] Inventor: Michael R. Cain, Lancaster, Pa.

[73] Assignee: Kerr Group Inc., Lancaster, Pa.

[21] Appl. No.: 422,460

[22] Filed: Apr. 17, 1995

[51] Int. Cl.$^6$ ............................................. B65D 53/00
[52] U.S. Cl. .................... 428/458; 428/460; 428/467; 428/484; 428/485; 428/537.1; 428/537.5; 215/347
[58] Field of Search ............................. 215/232, 347; 428/458, 460, 467, 484, 485, 537.1, 537.5

[56] References Cited

U.S. PATENT DOCUMENTS

| | | | |
|---|---|---|---|
| 2,501,849 | 3/1950 | Krebs | 215/261 |
| 2,620,939 | 12/1952 | Weisgerber | 215/347 |
| 3,330,720 | 7/1967 | Stevens et al. | 428/321.5 |
| 4,013,188 | 3/1977 | Ray | 215/347 |
| 4,151,924 | 5/1979 | Jameson | 215/347 |
| 4,579,240 | 4/1986 | Ou-Yang | 215/230 |
| 4,596,338 | 6/1986 | Yousif | 215/232 |
| 4,666,052 | 5/1987 | Ou-Yang | 215/230 |
| 4,778,698 | 10/1988 | Ou-Yang | 428/35 |
| 4,930,646 | 6/1990 | Emslander | 215/232 |
| 4,981,229 | 1/1991 | Lanham | 215/232 |
| 5,197,618 | 3/1993 | Goth | 215/347 |
| 5,381,913 | 1/1995 | Peeters | 215/232 |

*Primary Examiner*—Stevan A. Resan
*Attorney, Agent, or Firm*—Kenyon & Kenyon

[57] ABSTRACT

Two liners are provided: one for containers with dry contents, one for containers with liquid contents.

The liner for dry contents has layers pulp/foil/wax/paper/heat seal, which are laminated and placed into a closure. The closure is mounted on a container neck, after which an induction heating process is carried out. After induction, the pulp and foil layers remain in the closure while the wax layer is absorbed into the paper layer and stays on the container neck along with the heat seal layer.

The liner for liquid contents is composed of pulp/foil/polyester/wax/paper/polyester/heat seal. This liner, which is also laminated, is placed into a closure and mounted to a container neck. Following an induction heating process, a pulp/foil/polyester laminate remains on the closure while the paper/wax layer (wherein the wax has been absorbed by the paper) remains on the container neck along with a polyester layer and the heat seal layer.

Using the present invention, an excellent secondary seal may be achieved which functions as a true barrier for moisture and gas vapor.

8 Claims, 2 Drawing Sheets

SECOND SEAL FOR CLOSURE LINERS

FIELD OF THE INVENTION

The present invention relates to seals for containers, and more particularly to an air-impermeable seal for sealing medicinal bottles.

BACKGROUND OF THE INVENTION

Numerous attempts have been made in the art to create seals and liners for containers with enhanced sealing capabilities.

For example, U.S. Pat. No. 4,596,338, issued on Jun. 24, 1986 to Yousif, describes a liner with layers of pulp/foil/paper/wax/paper/heatseal. The paper lining the foil, however, allows gases to escape out of the side of the liner. As such, the embodiment of this reference is appropriate for use with containers of, e.g., coffee, where it is desired that the contents breathe. However, such liners would be inappropriate for those materials which suffer from continuous contact with air.

As other examples of liners, U.S. Pat. No. 2,620,939 issued on Dec. 9, 1952 to G. A. Weisgerber describes a liner with layers of paper/foil/resin.

U.S. Pat. No. 4,013,188 issued on Mar. 22, 1977 to Ray describes a liner with of foil/resin U.S. Pat. No. 2,501,849 issued on Mar. 28, 1950 to C. H. Krebs describes a bottle closure with a liner having layers of wax/paper/water-insoluble material/foil/water-insoluble material/paper.

U.S. Pat. No. 3,330,720 issued on Jul. 11, 1967 to E. J. Stevens et al. describes a liner with layers of (foil or paper or plastic)/wax/pulp.

U.S. Pat. No. 4,666,052 issued on May 19, 1987 to Ou-Yang describes a cap inner seal with layers of paper/(paper or polymer)/wax/foil/heatseal.

U.S. Pat. No. 5,197,618 issued on Mar. 30, 1993 to Goth describes a liner with layers of (tear-resistant backing) foil/(paper or fabric)/polymer.

U.S. Pat. No. 4,151,924 issued on May 1, 1979 to Jameson describes a liner with layers of fabric/paper/polymer.

U.S. Pat. No. 4,930,646 issued on Jun. 5, 1990 to Emslander describes a liner with layers of capliner/ethylcellulose/polyester.

Finally, U.S. Pat. No. 5,381,913 issued on Jan. 17, 1995 to Peeters describes a closure with an induction seal with layers foam/wax/paper/foil/paper/wax/polyester.

The basic structure of the industry standard liner may be seen in FIG. 1. In this figure, which shows a prior art liner, pulp layer 12 is the initial substrate layer, and is often referred to as the "primary layer". A wax layer 14 is laminated in known fashion onto pulp layer 12. A foil layer, which may be aluminum foil, is then mounted onto the wax layer. This foil layer is often referred to as the "secondary layer". Finally, a heat seal layer 18 is laminated to the foil layer.

One problem with such seals is that while the secondary layer provides a good barrier to the moisture vapor transfer rate (MVTR) and the gas transfer rate (GTR), the primary layer is a poor resealing layer. Other methods have been tried, such as pulp/polyester/wax/paper/foil/polyester sealing film, or a polyolefin foam with a wax absorbing layer; however, both methods are costly and complex.

Another prior art liner is shown in FIG. 2 in cross section. In this liner, as shown in the "before induction" phase in FIG. 2a, pulp layer 22 has laminated to it foil layer 24, paper layer 26, wax layer 28, polyester layer 30, and heat seal layer 32. After being mounted on the container in this laminated form, as shown in FIG. 2a, an RF frequency generator emits electromagnetic energy which is primarily absorbed at the aluminum foil layer 24 and the heat seal layer 32.

The energy of the RF frequency generator is such that the aluminum foil heats up, as does the heat seal. The foil, through the paper, heats the wax, causing the wax to be absorbed into the porous paper layer 26. Thus, the liner of FIG. 2a is transformed into the construction of FIG. 2b where the paper layer and the wax layer form one single layer. The entire liner system is conveniently placed in the closure so that when the closure is screwed onto the container top, or otherwise placed there, layers 22, 24 and the 26/28 layer remain in the closure while the polyester and heat seal layers, 30 and 32 respectively, are left to seal the opening of the container. This is assisted by the heat seal layer 32 bonding itself to the container opening during the RF frequency generation step.

A disadvantage of this system is that moisture vapor and gas vapor can escape out of the paper/wax layer 26/28. While the gases and vapors may have difficulty penetrating the foil layer, they may still escape out the sides of the paper/wax layer 26/28. While a better secondary seal is created in such a prior art liner than would be created if only a pulp backing was provided, the paper layer still allows a high MVTR and GTR.

Thus, the breathability of the liner allows this sort of prior art liner to be used to seal containers whose contents may be exposed to a continuous supply of air. However, for such products that degrade with contact with a continuous supply of air, there is still a need for an improved liner which would not allow such breathability.

SUMMARY OF THE INVENTION

These needs and others are met by the liner of the present invention. In particular, a laminated air-impermeable liner for a closure, for mounting on a container, is provided having a layer of pulp, a layer of metal foil adhesively secured to one surface of the layer of pulp, a layer of wax disposed on the surface of the layer of the metal foil which has a predetermined melting point, a layer of paper disposed on the layer of wax, and a layer of heat sealing material disposed on the surface of the layer of paper opposite the layer of the wax. Upon heating of the layer of metal foil to a temperature above the melting point of the layer of wax, the layer of wax melts and is absorbed into the paper and the paper is sealed to the rim of the container by the heat sealing material. Such a liner may effectively be used to seal contents of containers where the contents are generally dry.

Also disclosed in the invention is a laminated air-impermeable liner for a closure for mounting on a container, having a layer of pulp, a layer of metal foil adhesively secured to one surface of the layer of pulp, a first layer of a polymer material disposed on the surface of the layer of metal opposite the layer of pulp, a layer of wax disposed on the surface of the first layer of the polymer material, the wax having a predetermined melting point, a layer of paper disposed on the layer of wax, a second layer of polymer material disposed on the surface of the layer of paper opposite the layer of wax, and finally a layer of heat sealing material disposed on the surface of the second layer of a polymer material opposite the layer of paper. Upon heating of the layer of metal foil to a temperature above the melting point of the layer of wax, the layer of wax melts and is absorbed into the layer of paper; the layer of paper and layer of polymer material are sealed to the rim of the container by the heat sealing material. Such a liner may be effectively used to seal contents of containers where the contents are liquids.

The metal layers may be made of aluminum, the polymer layers may be made of polyester, polyethylene, or other such materials.

DETAILED DESCRIPTION

Two liners are provided: One for containers with dry contents and one for containers with liquid contents.

Figures 1, 2A, 2B, 3A, 4A:
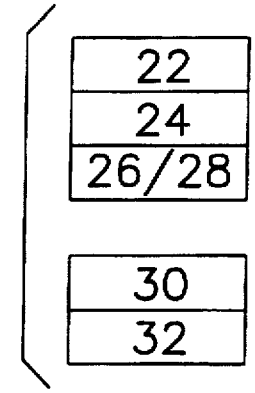
FIG. 1 shows a prior art liner in cross section.
FIG. 2a shows another prior art liner in cross section prior to the induction heating step.
FIG. 2b shows a prior art liner in cross section following the induction heating step.
FIG. 3a shows a liner according to an embodiment of the present invention in cross section, prior to the induction heating step, which may be used for the effective sealing of dry materials.
FIG. 4a shows a liner according to an embodiment of the present invention, this liner shown in cross section prior to the induction heating step, where this liner may be used to seal liquid contents of containers.

A liner for dry products according to an embodiment of the present invention is shown prior to an induction heating process in FIG. 3a. This liner may be effectively used to seal containers whose contents are generally dry. In this liner, which is a composite of several laminated layers, layer 104 represents a pulp board layer that provides backing for the rest of the layers. Onto pulp board backing layer 104 is mounted foil layer 106. Foil layer 106 is often composed of aluminum foil. Onto foil layer 106 is mounted wax layer 108. Onto wax layer 108 is placed paper layer 110 and thereupon is placed heat seal layer 112.

Figure 3B:
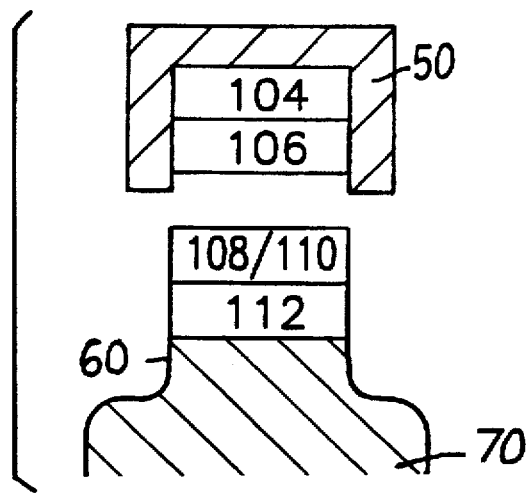
FIG. 3b shows a closure and container combination having the liner of FIG. 3a, following the induction heating step.

The entire liner, as represented by elements 104–112, and shown in FIG. 3a, is then placed in a closure. Often such a liner is placed near the base wall of the closure where the flat base wall meets the annular skirt (on which are mounted the threads). After mounting in the closure, the closure is placed on the container neck. This may be accomplished by a threading rotation or by a strictly longitudinal forcing of the closure over the threads of the container. Following the mounting step, an RF frequency generator generates electromagnetic waves which are directed in the general vicinity of the liner. This is termed "induction heating." The effect of the electromagnetic radiation is to selectively heat layers of the laminated liner. In particular, the metal foil layer 106 is heated by the RF frequency generator, and foil layer 106 in turn heats the wax layer 108. The wax layer 108, bounded on one side by a foil layer and on the other side by a porous paper layer, anisotropically melts and is absorbed into the paper layer 110. This situation is shown in FIG. 3b by element 108/110. The heat seal layer is also heated by the RF frequency generator and as such bonds to the neck of the container, and more particularly to the edge of the opening at the top of the neck of the container.

At this point, two separate laminates are created out of the initial laminated layer. Layers 104 and 106, the pulp and the foil, line the closure 50 and layers 108–110 and 112 are left to seal the container neck 60 of container 70. As layer 108 is metal foil rather than a paper product, it serves as an effective barrier against gas and moisture vapor escaping out through the closure.

In this invention, suitable materials for the heat seal layers may be any type of wax with molecules composed of long chains. For example, polyethylene and polypropylene, etc., may be effectively used as a heat seal. Moreover, standard laminating techniques and equipment may be used to achieve the seal of the present invention.

FIG. 4a shows a liner according to an embodiment of the present invention as this liner exists prior to the induction heating step. In particular, FIG. 4a shows pulp board backing layer 202 on which is mounted foil layer 204, polyester layer 206, wax layer 208, paper layer 210, polyester layer 212, and heat seal layer 214.

Figure 4B:
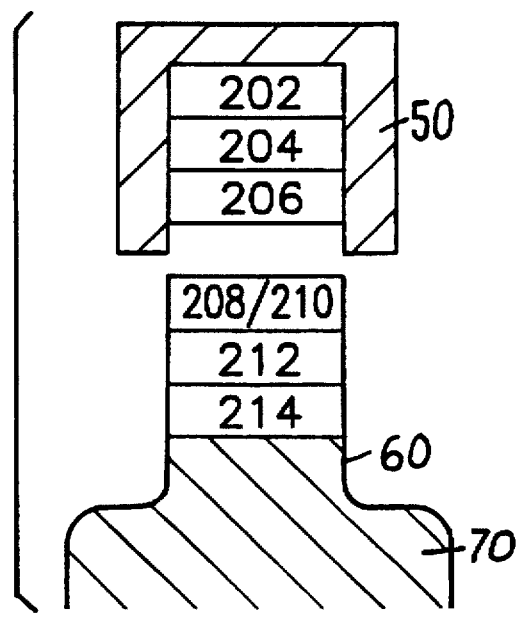
FIG. 4b shows a closure and container combination having the liner of FIG. 4a, following the induction heating step.

As described above in connection with the seal liner for dry contents, the seal liner for liquid contents, as shown in FIG. 4, is mounted in the container closure which is then mounted to the container neck. Following this step, an RF heating step takes place. Again, the RF frequency generator heats aluminum foil layer 206, causing a heating of wax layer 208, and a subsequent porous absorption of wax layer 208 into paper layer 210, as shown in FIG. 4b. Layers 202, 204 and 206 line the closure 50, and 208/210, 212 and 214 seal the container neck 60 of container 70.

It is, of course, understandable and to be expected that variations in the principles of construction disclosed herein in the embodiment may be made by one skilled in the art and it is intended that such modifications, changes, and substitutions are to be included within the scope of the present application. For example, while a polyester layer has been disclosed and shown in the pictured embodiments, any type of polymer fabric is contemplated by the liner of the present invention. The scope of the present application is limited only by the language of the claims appended hereto.

What is claimed is:

1. A closure and container combination each having a laminated air-impermeable liner for sealing the container neck, comprising:
   (a) a container having a neck, the neck being sealed by a first seal laminate thereon which serves as a barrier against escape of gas and moisture vapor from the container neck, the first seal laminate consisting of:
      a layer of heat sealing material disposed on the container neck;
      a layer of paper disposed on the layer of heat sealing material; and
      a layer of wax absorbed into the layer of paper; and
   (b) a closure having therein a second seal laminate which serves as a barrier against escape of gas and moisture vapor from the container neck to reseal the container neck, the second seal laminate consisting of comprising a layer of metal foil adjacent the first seal laminate, and a layer of pulp adhesively secured to the layer of metal foil on the surface opposite the first seal laminate.

2. The liner of claim 1, wherein said metal is aluminum.

3. A closure and container combination each having a laminated air-impermeable liner for sealing the container neck, comprising:
   (a) a container having a neck, the neck being sealed by a first seal laminate thereon which serves as a barrier against escape of gas and moisture vapor from the container neck, the first seal laminate consisting of comprising:

a layer of heat sealing material disposed on the container neck;

a first polymer layer disposed on the layer of heat sealing material;

a layer of paper disposed on the surface of the first polymer layer opposite the layer of heat sealing material; and a layer of wax absorbed into the layer of paper; and (b) a closure having therein a second seal laminate which serves as a barrier against escape of gas and moisture vapor from the container neck to reseal the container neck, the second seal laminate consisting of a second polymer layer adjacent the first seal laminate, a layer of metal foil disposed on the surface of the second polymer layer opposite to the first seal laminate, and a layer of pulp adhesively secured to the surface of the layer of metal foil opposite the second layer of polymer.

4. The liner of claim 3, wherein said metal is aluminum.

5. The liner of claim 3, wherein at least one of the polymer layers is polyester.

6. A liner according to claim 5, wherein the first and second polymer layers are polyester.

7. A method of sealing a container, comprising:

(a) providing a liner comprising:
  (i) a first seal laminate for sealing a container neck, consisting of:
    a layer of heat sealing material to be placed on the container neck;
    a layer of paper disposed on the surface of the heat sealing material; and
    a layer of wax disposed on the layer of paper and having a predetermined melting point;
  (ii) a second seal laminate for resealing a container neck, consisting of:
    a layer of metal foil disposed on the surface of the wax layer opposite the layer of paper; and
    a layer of pulp adhesively secured to the surface of the layer of metal foil opposite the metal foil layer;

(b) mounting the liner in a closure;

(c) placing the closure on a container neck; and (d) heating the liner to a temperature above the melting point of the wax to melt the layer of wax so that the wax is absorbed into the layer of paper and the layer of paper is sealed to a rim of the container so that the first seal serves as a barrier against escape of gas and moisture vapor from a container neck, and the second seal serves as a barrier to reseal a container neck against escape of gas and moisture vapor.

8. A method of sealing a container, comprising:

(a) providing a liner comprising:
  (i) a first seal laminate for sealing a container neck, consisting of:
    a layer of heat sealing material to be placed on the container neck;
    a first polymer layer disposed on the layer of heat sealing material;
    a layer of paper disposed on the surface of the layer of polymer opposite the layer of heat sealing material; and
    a layer of wax disposed on the layer of paper and having a predetermined melting point;
  (ii) a second seal laminate for resealing a container neck, consisting of comprising:
    a second polymer layer disposed on the layer of wax opposite the layer of paper;
    a layer of metal foil disposed on the surface of the second layer of polymer material opposite the layer of wax; and
    a layer of pulp adhesively secured to the surface of the layer of metal foil opposite the second layer of polymer;

(b) mounting the liner in a closure;

(c) placing the closure on a container neck; and (d) heating the liner to a temperature above the melting point of the wax to melt the layer of wax so that the wax is absorbed into the layer of paper and the layer of paper is sealed to a rim of the container so that the first seal serves as a barrier against escape of gas and moisture vapor from a container neck, and the second seal serves as a barrier to reseal a container neck against escape of gas and moisture vapor.

* * * * *